April 16, 1968     A. N. DI ADDARIO     3,377,636
BED COVERING
Filed March 3, 1966     6 Sheets-Sheet 1
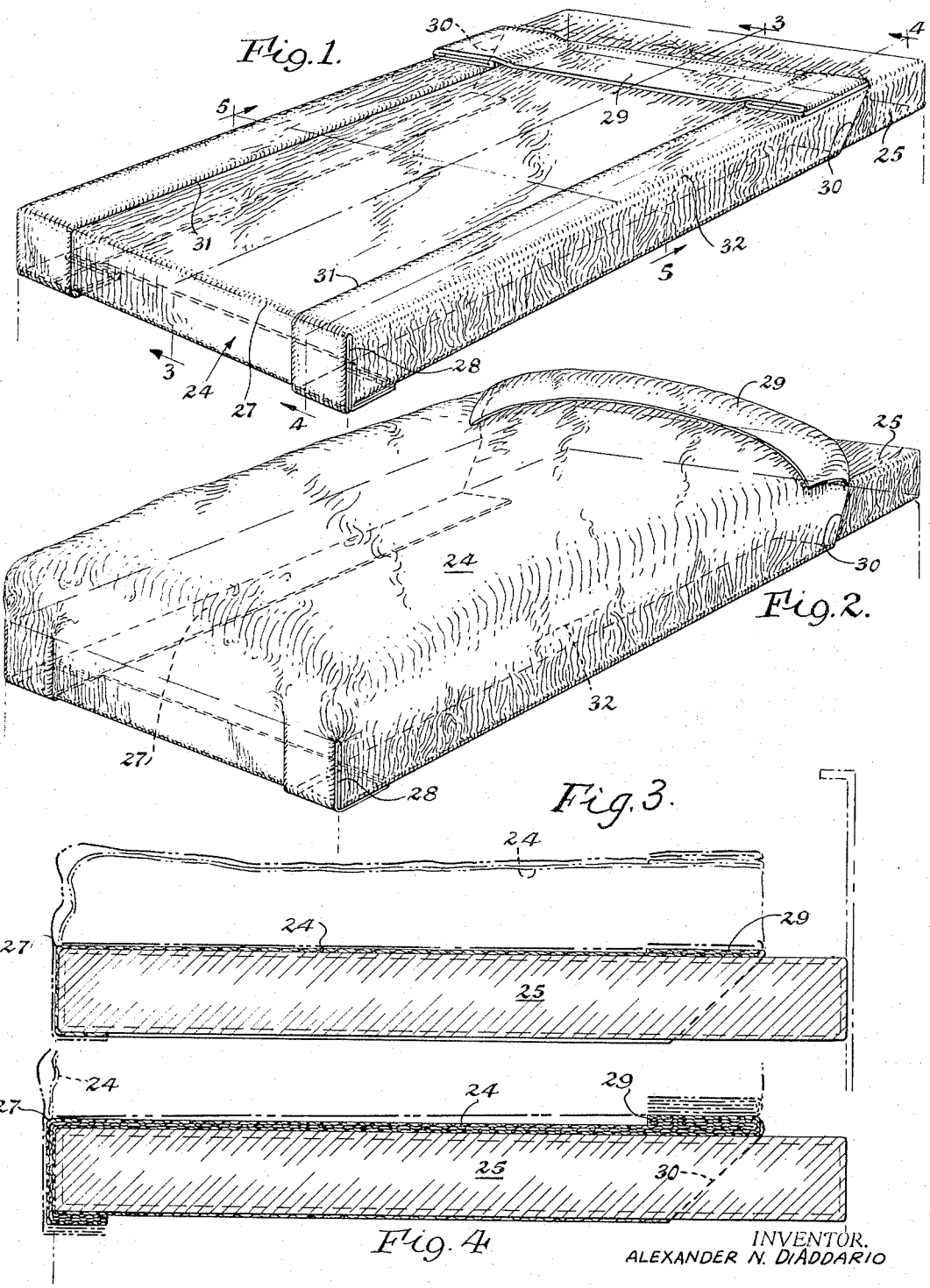
INVENTOR.
ALEXANDER N. DiADDARIO
BY
Bean, Brooks, Buckley & Bean
ATTORNEYS

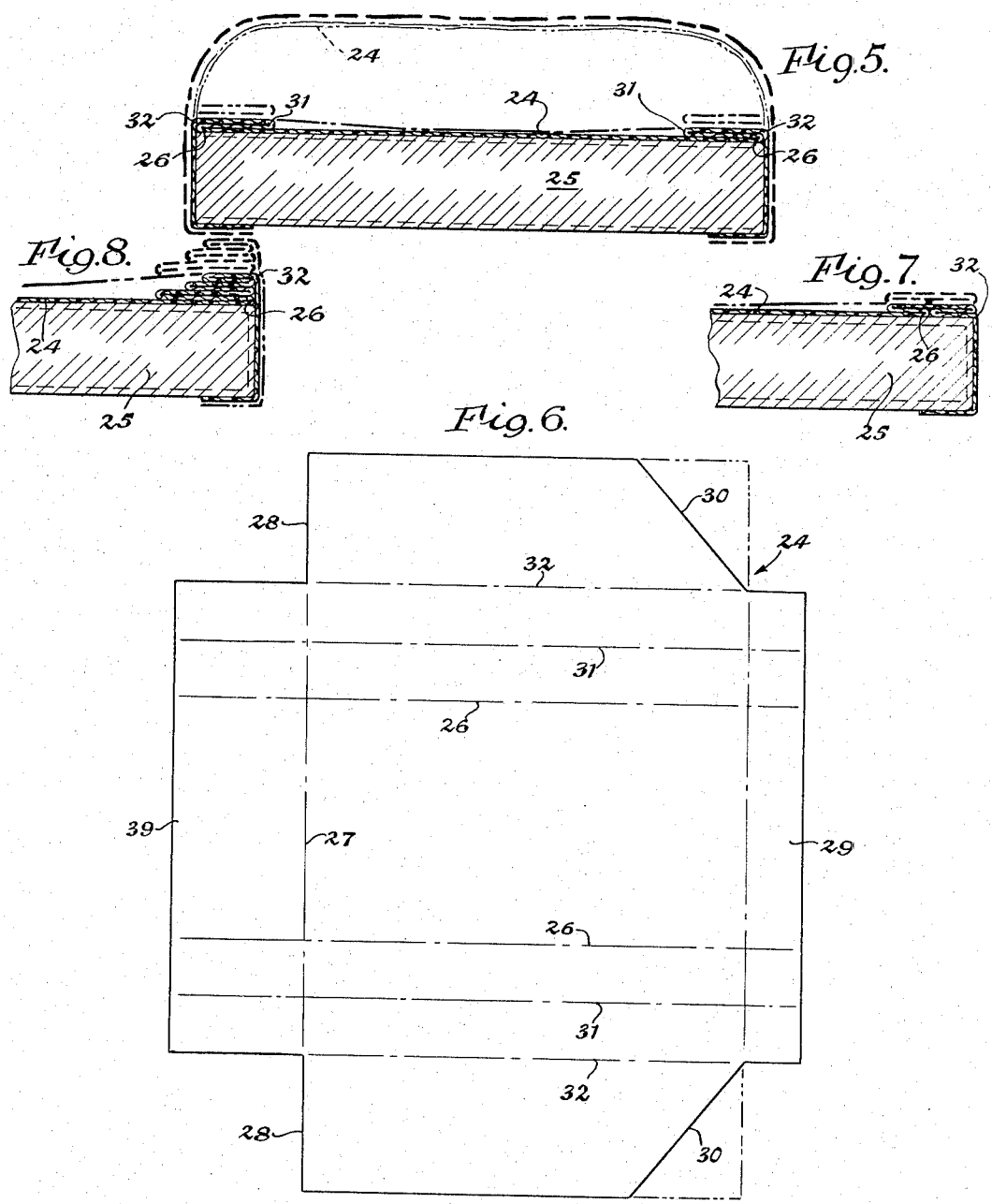

April 16, 1968 — A. N. DI ADDARIO — 3,377,636
BED COVERING
Filed March 3, 1966 — 6 Sheets-Sheet 3

INVENTOR.
ALEXANDER N. DIADDARIO
BY
Bean, Brooks, Buckley & Bean
ATTORNEYS

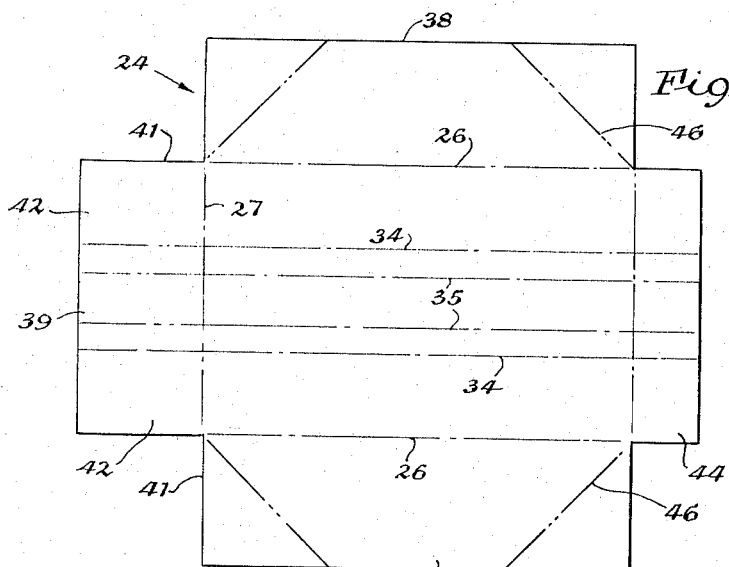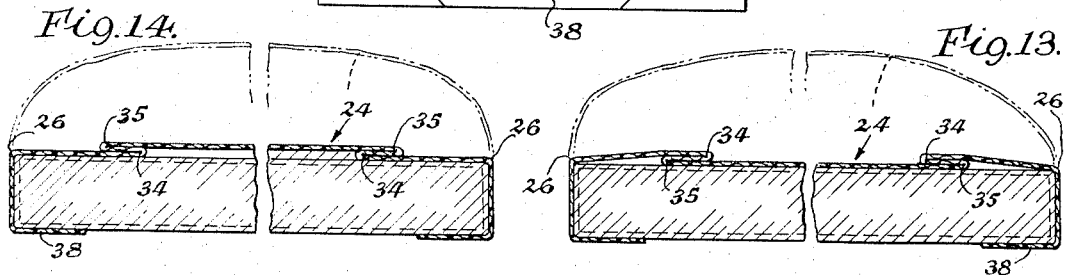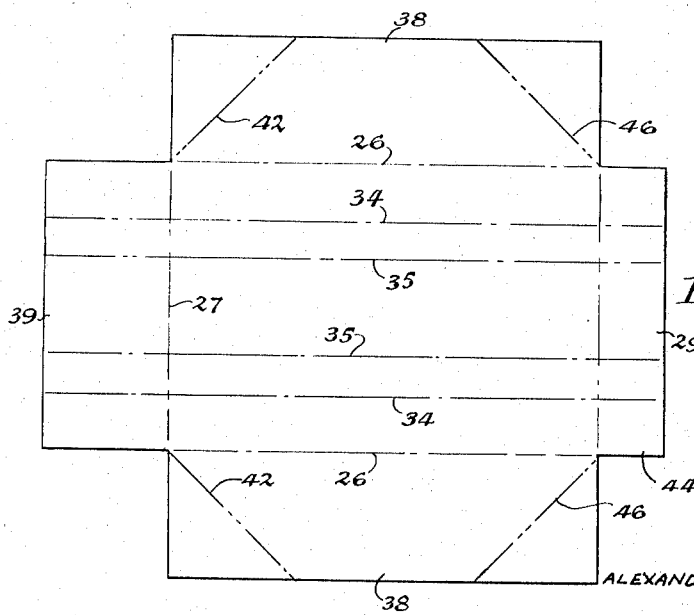

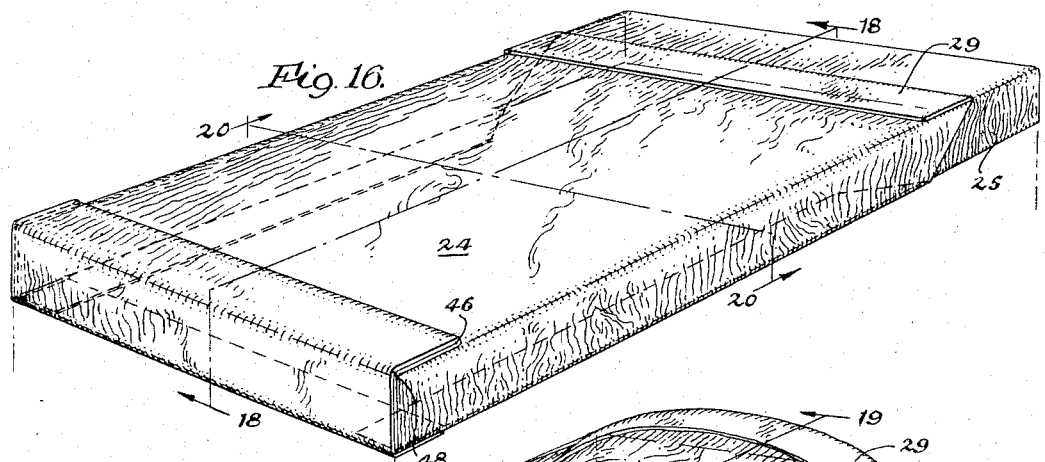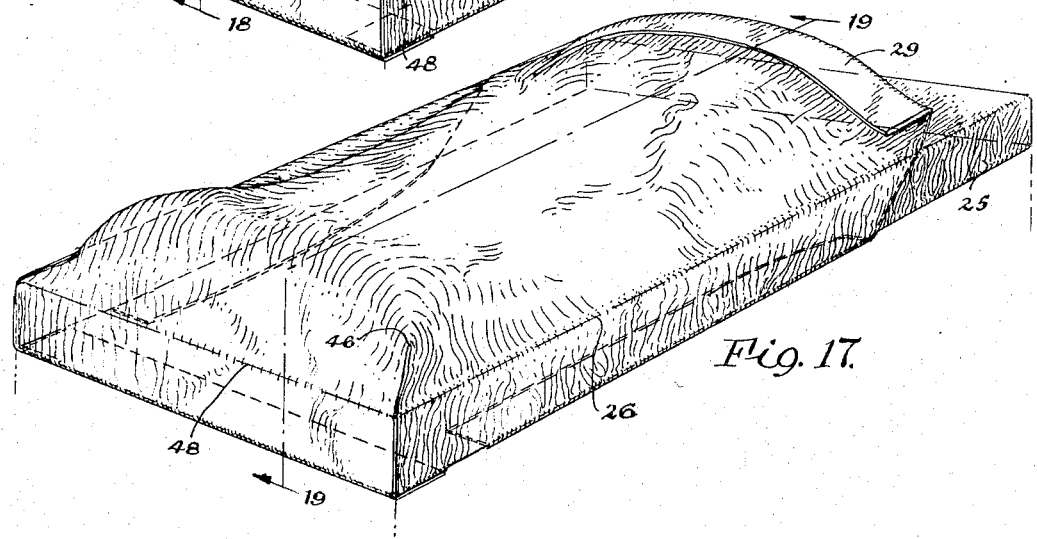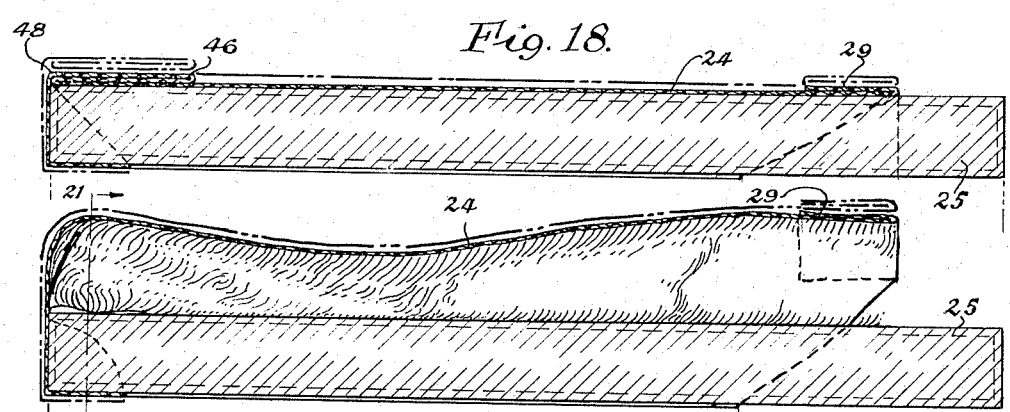

April 16, 1968  A. N. DI ADDARIO  3,377,636
BED COVERING
Filed March 3, 1966  6 Sheets-Sheet 6
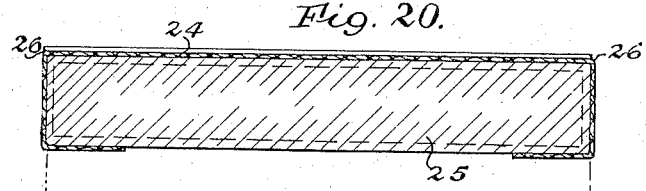
Fig. 20.
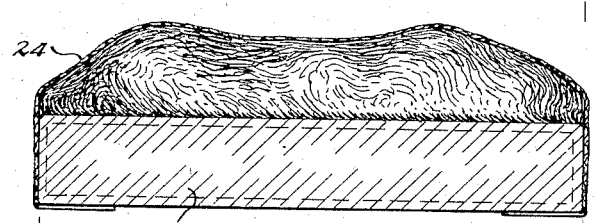
Fig. 21.
Fig. 22.
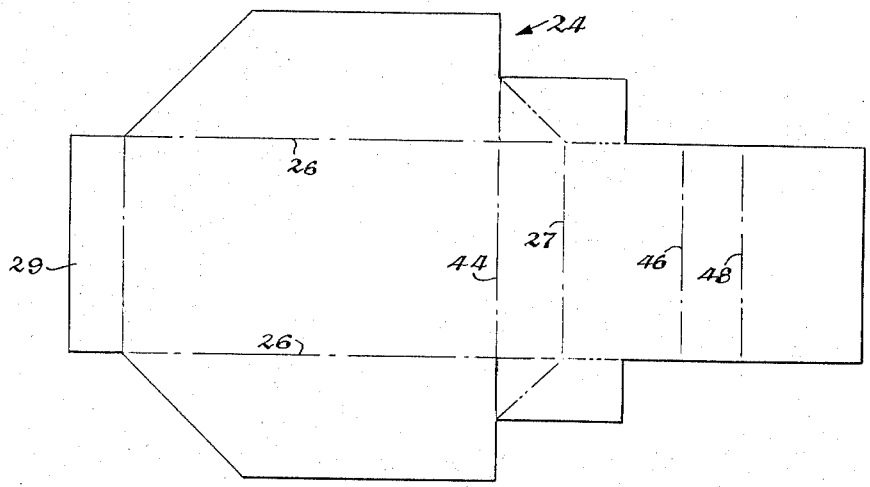
Fig. 23.
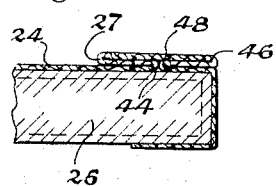
INVENTOR.
ALEXANDER N. DI ADDARIO
BY
Bean, Brooks, Buckley & Bean
ATTORNEYS

United States Patent Office 3,377,636
Patented Apr. 16, 1968

3,377,636
BED COVERING
Alexander N. Di Addario, 8888 The Fairways,
Clarence, N.Y. 14031
Filed Mar. 3, 1966, Ser. No. 531,425
3 Claims. (Cl. 5—334)

ABSTRACT OF THE DISCLOSURE

A bed sheet or the like having a main body portion and opposite side and lower end extensions with the extensions being separated along cutout lines and the main body being provided with longitudinally extending fold guide lines so that the bed covering may take on a neat appearance while allowing billowing thereof to receive the sleeper's body.

Cross reference to related application

This application relates to improvements concerned with the subject matter of my copending application Ser. No. 342,132, filed Feb. 3, 1964, and now Patent No. 3,254,348.

Brief summary of the invention

The present invention relates to bed clothing such as a bed sheet or blanket which facilitates "making up" a bed in improved manner so as to avoid undesirable bed clothing constrictions upon the feet or other parts of the sleeper's body.

Brief description of the drawings

FIG. 1 is a top perspective view showing a bed "made up" with a sheet or blanket (or both) in accordance with the present invention;

FIG. 2 illustrates how the bed covering of FIG. 1 appears when "opened up" and occupied;

FIGS. 3 and 4 are sections taken as suggested by lines 3—3 and 4—4 of FIG. 1, respectively;

FIG. 5 is a fragmentary section taken as suggested by line 5—5 of FIG. 1;

FIG. 6 is a planform view of a sheet or blanket adapted to be "made-up" as shown in FIGS. 1–5;

FIGS. 7 and 8 are sectional views showing alternative techniques of "making-up" the bed clothing at the sides of the bed in accordance with the invention;

FIG. 12 is a view corresponding to FIG. 6 showing the form of bed sheet or blanket or the like adapted to be made-up in accordance with the invention as illustrated at FIGS. 9–11.

FIGS. 13 and 14 are views corresponding to FIGS. 10–11 but showing further modifications of bed-making arrangements in accordance with the invention;

FIG. 15 is a view corresponding to FIG. 12 but showing the form of bed-covering of the invention adapted to be made-up as shown in FIGS. 13–14.

FIGS. 16 and 17 are views corresponding to FIGS. 1, 2, but showing a still further variation of the "bed-making" technique in accordance with the invention;

FIGS. 18 and 19 are sectional views taken as suggested by lines 18—18 and 19—19 of FIGS. 16–17, respectively;

FIG. 20 is a sectional view taken as suggested by line 20—20 of FIG. 16;

FIG. 21 is a sectional view taken as suggested by line 21—21 of FIG. 19;

FIG. 22 is a view corresponding to FIG. 15 but showing the bed covering device of FIGS 16–21; and FIG. 23 is a fragmentary sectional view corresponding to the foot end portion of FIG. 18 but showing an alternate native folding arrangement at the foot end of the bed when using a sheet as shown in FIG. 22.

Figure 9:
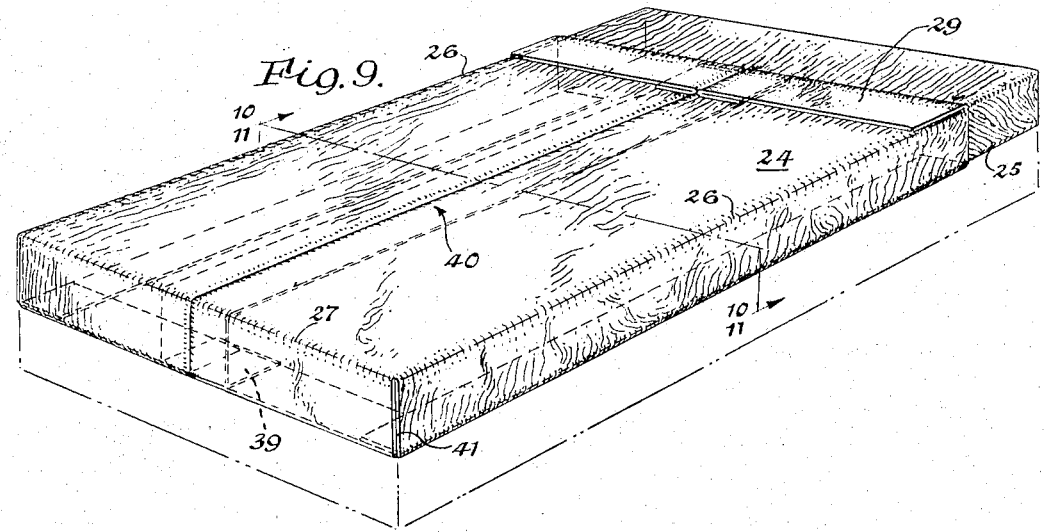
FIG. 9 corresponds to FIG. 1 but shows a modified form of bed sheet or blanket "make-up" in accordance with the invention.

As shown by way of example herein at FIGS. 1–8, the invention may be embodied in a bed sheet (blanket or other covering hereinafter termed "sheet") which is designated generally at 24. As shown herein the sheet 24 is illustrated as being "made-up" on a mattress 25. As best shown in FIG. 6, the sheet 24 is provided with series of basic guide lines 26—26 running lengthwise of the sheet along opposite sides thereof; and also a basic guide line 27 running across the bottom end of the sheet. The guide lines 26, 26, 27, are positioned on the sheet to conform to the planform dimensions of the mattress upon which the sheet is to be used after the sheet is "made-up" as will be explained hereinafter.

To reduce the volume of material at the foot corners of the bed, the bed clothing piece may be cut out as indicated at 28—28 in FIG. 6. Also, as shown at 29, the head end of the sheet may be formed with a "chin-flap" portion adapted to be back-folded over the top edge of a blanket or the like such as may also be made up with the sheet. As indicated at 30 (FIG. 6) the sheet may be bevelled off at each side adjacent the head end to reduce the length of the side tuck-ins under the mattress, thus permitting fuller "opening" of the bed without disturbing the side tuckins.

The sheet is provided with supplementary guide lines 31, 32, at opposite sides thereof, disposed in parallel relation with the guide lines 26, 26. These facilitate and guide the folding of the sheet into the bed-making arrangements shown in FIGS. 1, 5. Also note that as shown in FIG. 4, two (or more) sheets, blankets, or bedspread devices or the like, may be interfolded as explained hereinabove in the manner of the single sheet arrangement shown in FIGS. 1–6. Also note that as shown in FIG. 7 the sheet at side edge of the bed may be accordion-folded to provide for the free-uplift thereof. Or, as shown in FIG. 8, a still further modification of the fold arrangement may be provided in the form of a "shingled" or pleated fold pattern. All of the guide lines may be either printed or woven or embroidered in the fabric, or otherwise indicated; and preferably will comprise portions of the ornamentation of the sheet (or blanket or other covering, as the case may be).

To make up a bed with a sheet or other covering as shown in FIG. 1, a sheet as shown in FIG. 6 will first be spread flat-wise upon the mattress and located thereon so that the guide lines 26—26 will lie along the side edges of the mattress, and so that the guide line 27 will lay along the foot end of the mattress. The sheet will then be lifted and the sheet material accordion-folded thereunder into the form shown in FIG. 5; the extreme edge portions of the sheet being then draped down along the sides of the mattress and tucked thereunder as shown in FIG. 5. The foot end of the sheet is then tucked under the mattress as shown in FIGS. 1–3, 4. The accordion folds are guided by the lines 31–32 along the sides.

It will be apparent that pluralities of bed clothing pieces such as a sheet, a blanket, and a bedspread, or the like, may with equal facility be folded together as a unit as explained hereinabove; and in any case the bed coverings will thereupon be adapted to be simply lifted up to provide a freely open enclosure for the sleeper as illustrated at FIG. 2, and by means of broken lines at FIGS. 3, 4, 5. Thus, for example, when the sleeper thrusts his feet down into the lower end of the bed, the bed clothing will not have that aggravating tendency to pull down upon his toes or other parts of his body. Yet, when he bed is "made-up" in accord with the invention, it provides as neat and tidy an appearance as any bed made up in the conventional manner.

Figure 10:
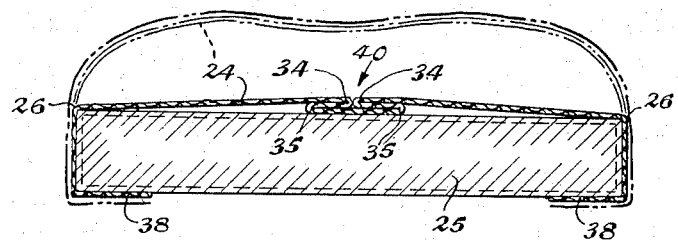
FIGS. 10 and 11 are fragmentary sectional views corresponding to FIG. 5 but showing alternative modes of "making-up" the bed in accordance with the invention.
Figure 11:
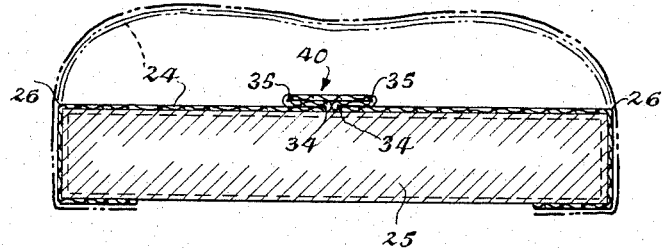

FIGS. 9–12 illustrate another form of bed clothing of the invention, wherein the expansion-fold guide lines are centrally located on the sheet. Thus, in this case, the sheet may be accordion-folded as indicated generally at 40 along the center line of the bed. Or, as illustrated at FIGS. 13, 14, 15, the fold guide lines may be so located as to guide the folding to occur anywhere intermediately of the side edges of the bed.

FIGS. 16–23 illustrate still another form of bed sheet pattern of the invention wherein fold guide lines are provided only at the foot end of the bed. Thus, as shown in FIG. 22, guide lines 26, 26, 27, are provided to match the plan form dimensions of the mattress to guide the bed-maker in initially placing the sheet thereon. Supplemental fold guide lines 44, 46 and 48 (FIG. 22) are then provided on the foot end portion of the sheet to guide the bed-maker in folding the foot end of the sheet into the forms illustrated either at FIGS. 16–21, or at FIG. 23, as may be preferred.

It will be apparent that whereas only a few forms of the invention have been illustrated and described in detail hereinabove, it will be understood that various changes may be made therein without departing from the spirit of the invention or the scope of the following claims.

I claim:

1. A bed covering to be applied to a mattress of rectangular configuration, said covering comprising a sheet-like member having a rectangular main body portion adapted to overlie the mattress and opposite side and lower end extensions adapted to be tucked around and under the corresponding sides and end of the mattress, there being corner cutouts separating said extensions, and at least a pair of fold guide lines extending longitudinally substantially centrally within said main body portion inwardly of said opposite side extension and extending into and across said lower end extension.

2. A bed covering as set forth in claim 1 wherein said fold guide lines include four parallel fold guide lines running lengthwise of said main body portion throughout the laterally central portion thereof.

3. A bed covering as set forth in claim 1 wherein said guide lines comprise two pairs of guide line groups each group including two parallel disposed guide lines, said groups being disposed to define pleat fold guide lines along opposite sides of said main body portion when disposed in flatwise bed-making position on a mattress.

References Cited

UNITED STATES PATENTS

| | | | |
|---|---|---|---|
| 3,090,052 | 5/1963 | Goldsmith | 5—334 |
| 2,772,425 | 12/1956 | Brodie | 5—334 |
| 3,254,348 | 6/1966 | Di Addario | 5—334 |

CASMIR A. NUNBERG, *Primary Examiner.*

BOBBY R. GAY, *Examiner.*

A. CALVERT, *Assistant Examiner.*